Sept. 29, 1931.    T. H. SHOPE    1,825,099
METHOD OF GROWING VEGETABLES AND FRUIT
Filed Sept. 29, 1930
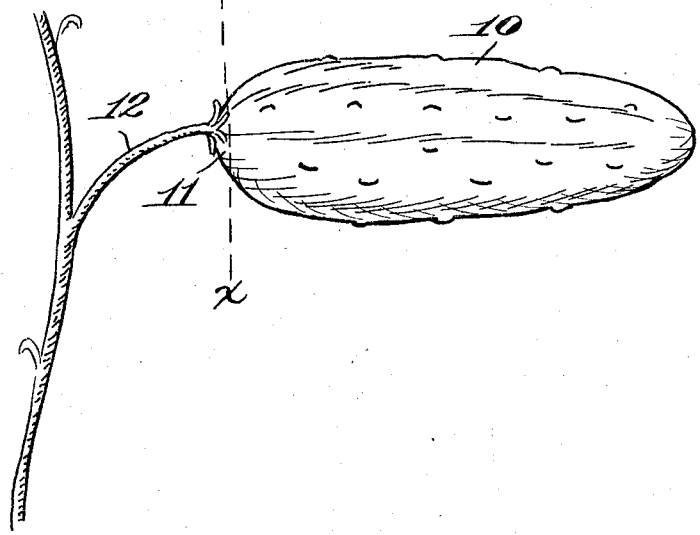
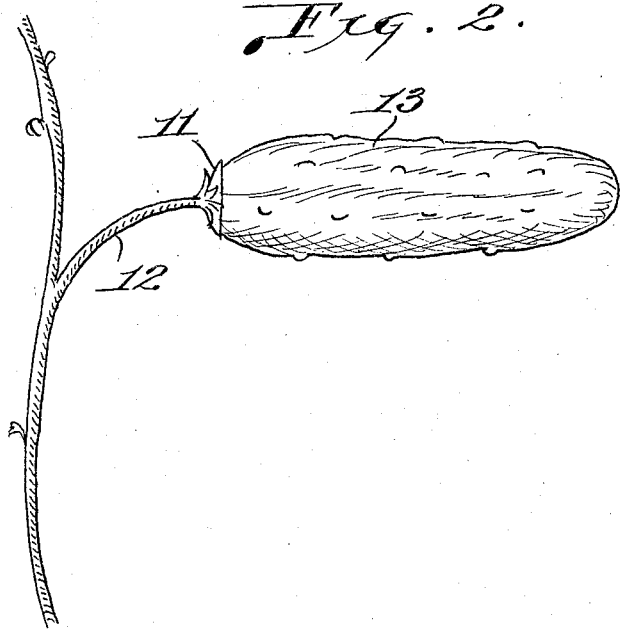
INVENTOR:—
THOMAS H. SHOPE.
BY Martin P. Smith ATTY.

Patented Sept. 29, 1931

1,825,099

UNITED STATES PATENT OFFICE

THOMAS H. SHOPE, OF SOUTHGATE, CALIFORNIA, ASSIGNOR OF ONE-HALF TO W. B. SHOPE, OF SOUTHGATE, CALIFORNIA

METHOD OF GROWING VEGETABLES AND FRUIT

Application filed September 29, 1930. Serial No. 485,147.

My invention relates to a method of growing vegetables and fruit and has for its principal object, the provision of a relatively simple and economical easily practiced method whereby the production of certain vegetables and fruits can be materially increased.

I have discovered in tests and experiments, that it is possible to produce second growth vegetables and fruits by cutting the first grown vegetables or fruits from their stems or vines and which cutting operation is accomplished so as to leave relatively small portions of the first grown vegetables or fruits upon the stems or vines in order to provide a base or slip for the second growth vegetables or fruit.

In the accompanying drawings Fig. 1 is an elevational view of a portion of a cucumber vine showing a first growth cucumber connected by its stem to said vine and with a dotted line showing the point where the vegetable is cut from its stem in order to produce the second growth vegetable.

Fig. 2 is an elevational view of a second growth cucumber produced in accordance with my improved method.

In practicing my improved method for the production of second growth vegetables such as cucumbers, the first growth cucumbers are removed from their stems by cutting the bodies of the cucumbers at points immediately adjacent to the points where the bodies of the cucumbers join the stems, this line of separation or cut being designated by the dotted line X—X in Fig. 1.

The body 10 of the first growth cucumber is then removed, thereby leaving a relatively small portion 11 of the end of the cucumber body joined to the stem 12. This portion 11 of the body forms a base or slip from which grows, in a comparatively short time, a second growth cucumber body 13, as illustrated in Fig. 2 and which latter is in every respect practically identical with the first growth cucumber.

In order to insure the second growth of vegetables or fruits in accordance with my invention, it is desirable, although not essential, that the first growth vegetables or fruits be cut from their stems before they have reached their full growth and become ripe.

In repeated tests and experiments I have, in accordance with my invention, produced second growth cucumbers and from the results achieved it is my present belief that my improved method may be practiced for the production of second growth vegetables such as squash, pumpkins, watermelons, cantaloup as well as certain varieties of fruit.

Thus it will be seen that I have provided a relatively simple, economical and easily practiced method for the production of second growth vegetables and fruit, and which method is effective in materially increasing the volume production of fruits and vegetables.

I claim as my invention:

1. The herein described method of producing second growth vegetables and fruit which consists in separating the bodies of the first growth vegetables or fruit from their stems at points adjacent to the points where said bodies join said stems so as to leave a relatively small portion of the first growth body attached to the stem to provide a base or slip for the second growth vegetable or fruit.

2. The herein described method of producing second growth vegetables and fruit, which consists in cutting the bodies of the first growth vegetables or fruit from their stems prior to the complete development and ripening of said first growth vegetables and fruit so as to leave relatively small portions of the bodies of the first growth vegetables and fruit attached to the stems to form bases or slips for the second growth vegetables or fruit.

3. The herein described method of producing second growth vegetables and fruit which consists in separating the bodies of first growth vegetables and fruit from their stems at points beyond the points where said bodies join said stems.

In testimony whereof I affix my signature.

THOMAS H. SHOPE.